United States Patent
Suryanarayana

(10) Patent No.: US 12,437,116 B2
(45) Date of Patent: Oct. 7, 2025

(54) MULTI-PATH ZERO TRUST BOOT METHOD TO SUPPORT CONTEXT-SPECIFIC OEM REBRANDING

(71) Applicant: Dell Products L.P., Round Rock, TX (US)

(72) Inventor: Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 18/298,977

(22) Filed: Apr. 11, 2023

(65) Prior Publication Data
US 2024/0346184 A1    Oct. 17, 2024

(51) Int. Cl.
*G06F 21/00*    (2013.01)
*G06F 21/57*    (2013.01)
*G06F 21/64*    (2013.01)

(52) U.S. Cl.
CPC ............ *G06F 21/64* (2013.01); *G06F 21/575* (2013.01)

(58) Field of Classification Search
CPC ................................ G06F 21/64; G06F 21/575
See application file for complete search history.

(56) References Cited

U.S. PATENT DOCUMENTS

| | | | | |
|---|---|---|---|---|
| 2014/0075567 A1* | 3/2014 | Raleigh | ............... | H04L 12/14 726/26 |
| 2014/0380425 A1* | 12/2014 | Lockett | ............... | G06F 21/00 726/4 |
| 2019/0339888 A1* | 11/2019 | Sasidharan | ........... | G06F 3/0679 |
| 2020/0364040 A1* | 11/2020 | Chao | ................... | G06F 9/44536 |
| 2021/0103661 A1* | 4/2021 | Wu | ....................... | G06F 21/572 |

* cited by examiner

*Primary Examiner* — Ghazal B Shehni
(74) *Attorney, Agent, or Firm* — Jackson Walker L.L.P.

(57) ABSTRACT

Disclosed methods enable a mutable OEM identity to dynamically perform context-specific rebranding as part of a zero trust platform boot. This zero trust rebrand (ZTR) boot may implement an OEM security context identity method to fully ensure trusted rebrand boot paths against tampered, vulnerable, or corrupted payloads while leveraging existing customer-agnostic secure boot flow. Disclosed platforms may implement context-specific mutable entities via multiple boot paths to support the dynamic rebranding. A factory deploy engine may perform a bare metal deploy with a disclosed OEM security identity protocol, initialized by enumerating, for each of one or more OEMs, all OEM context attributes required for dynamic rebrand support. The rebrand protocol may create a protected namespace in non-volatile storage, e.g., a serial peripheral interface (SPI) flash area, to perform a once-only store of all OEM-specific mutable entities.

14 Claims, 3 Drawing Sheets

MULTI-PATH ZERO TRUST BOOT METHOD TO SUPPORT CONTEXT-SPECIFIC OEM REBRANDING

TECHNICAL FIELD

The present disclosure pertains to information handling systems and, more-specifically, original equipment manufacturing (OEM) branding of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a-specific user or-specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems are manufactured and/or distributed by entities widely referred to as original equipment manufacturers (OEMs), which may be broadly defined for purposes of this disclosure as producers of end-product information handling systems. While an information handling system, also referred to herein simply as a platform, may include branding that conveys the identity of the OEM, such branding is largely static.

Immutable branding is, in at least some respects, a consequence of zero trust architecture policies that require strong authentication and verification of user and device identities without regard to context, such as whether a user connects from within a corporate firewall, whether communication occurs by way of a virtual private network (VPN), and so forth. Once a platform is branded with an OEM brand in a factory, rebranding of the OEM identity can only occur within a factory mode operating environment that is highly restricted and generally unachievable outside of an OEM factory environment.

SUMMARY

Disclosed subject matter, at least in part, enables a mutable OEM identity to dynamically perform context-specific rebranding as part of a zero trust platform boot referred to as zero trust rebrand (ZTR) boot. ZTR boot may implement an OEM security context identity method to fully ensure trusted rebrand boot paths against tampered/vulnerable/corrupted payloads while leveraging existing customer-agnostic secure boot flow.

In at least some embodiments, disclosed platforms implement context-specific mutable entities via multiple boot paths to support dynamic rebranding of end to end solutions for OEM vendors. A factory deploy engine may perform a bare metal deploy with a disclosed OEM security identity protocol, referred to herein simply as a rebranding protocol, initialized by enumerating, for each of one or more OEMs, all OEM context attributes required for dynamic rebrand support. The rebrand protocol may create a protected namespace in non-volatile storage, e.g., a serial peripheral interface (SPI) flash area, to perform a once-only store of all OEM-specific mutable entities.

Context-specific signatures per OEM may be defined and stored in a persistent store, e.g., a platform nonvolatile (NV) store. Once the persistent store is fused with mutable entities and context signatures, the boot policy is published to ensure that the existing secure boot path is unaltered and that dynamic rebranding only impacts published boot policy based on OEM context boot.

In one aspect, disclosed systems and methods store, for each of one or more OEMs, one or more mutable entities in a protected OEM context (OC) namespace. One or more context-specific signatures per OEM are stored in a platform store, e.g., a platform NV store such as an SPI flash memory, and an OEM index key, determined based on a current boot context, is applied. One or more mutable entities are loaded based on the OEM context boot before continuing with a regular customer agnostic secure boot path. Storing the one or more mutable entities may include performing a one-time-only factory mode storing of the one or more mutable entities such that the mutable entities cannot be altered outside of the factory mode. An OEM context boot policy may be published to ensure that the boot path for the pre-existing secure boot path is unaltered. Thus, a customer-agnostic secure boot flow may proceed to boot a customer-agnostic firmware image while the OEM context security identity flow loads the mutable entries.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
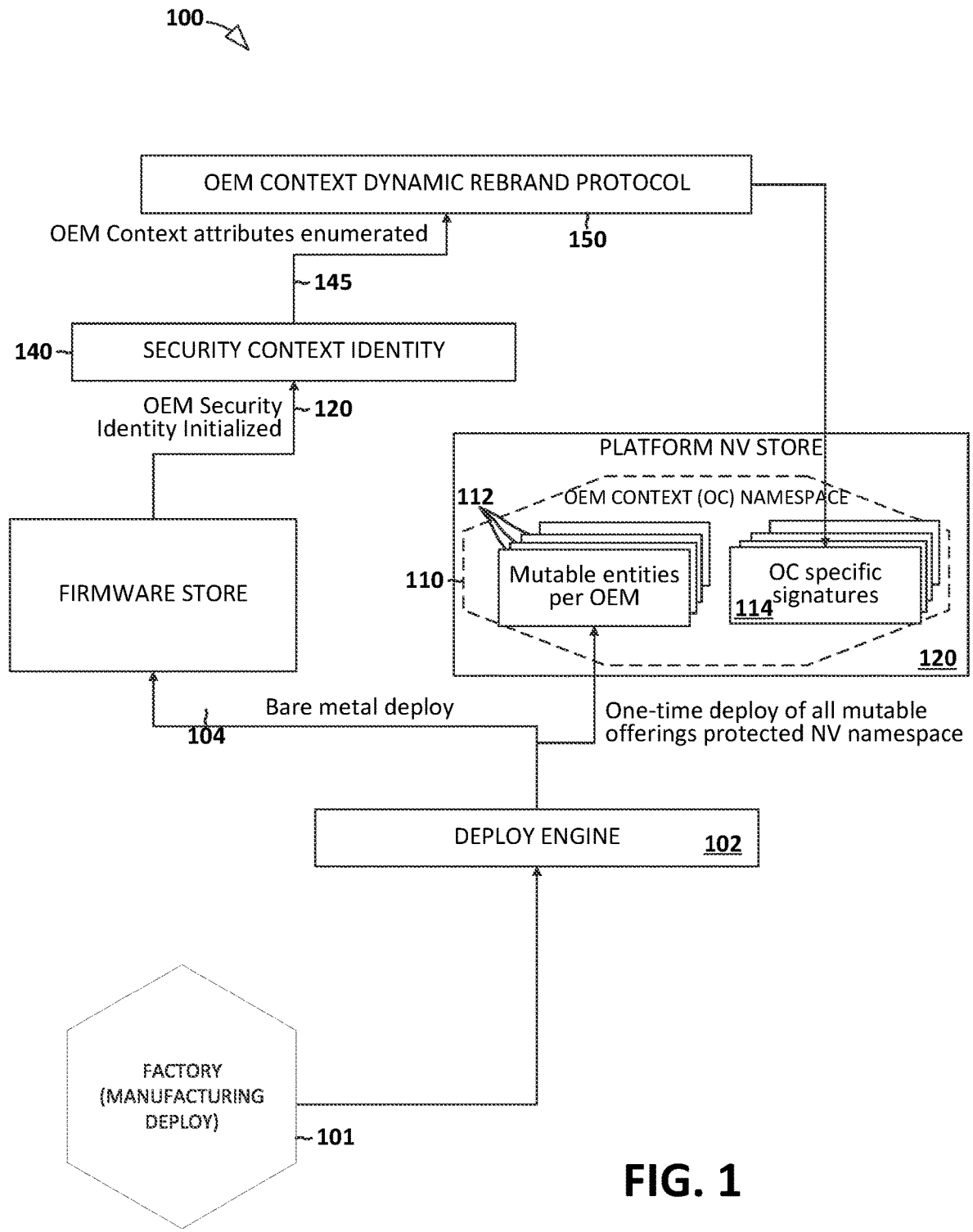
FIG. 1 illustrates a one-time factory deployment of mutable entities and context-based rebrand enumerations in accordance with disclosed OEM rebranding systems and methods.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a-specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates aspects of a method 100 to implement context-specific mutable entities via multiple boot paths to support dynamic rebranding for OEM vendors. A factory deploy mode 101 is defined to implement a bare metal deploy engine 102 performing a bare metal deploy 104 to initialize (120) an OEM context identity 140 to ensure a trusted rebrand boot path against tampered, vulnerable, and/or corrupted payloads. An OEM context dynamic rebrand protocol 150 may then enumerate (145), for each of one or more OEMs, all OEM context attributes required to support the desired dynamic rebrand entities.

As depicted in FIG. 1, deploy engine 102 creates a protected namespace, referred to herein as protected OEM context (OC) namespace 110. In at least one embodiment, protected OC namespace 110 comprises a protected namespace within a specified area of a nonvolatile storage device such as a serial protocol interface (SPI) flash memory device, to store mutable entity files 112 for each of the one or more OEMs wherein each mutable entity file 112 defines or otherwise identifies, for each OEM, each of the one or more supported mutable entities. In at least some embodiments, no alterations of the protected OC namespace 110 are permitted after the platform leaves the factory. FIG. 1 further illustrates OC-specific signatures 114 per OEM are defined and stored in platform NV store 120.

Once platform NV store 120 is configured with mutable entities 112 and OC-specific signatures 114, the boot policy is published to ensure the existing secure boot path is unaltered. In this manner, the newly published boot policy only impacts the dynamic rebranding based on OEM context boot.

Figure 2:
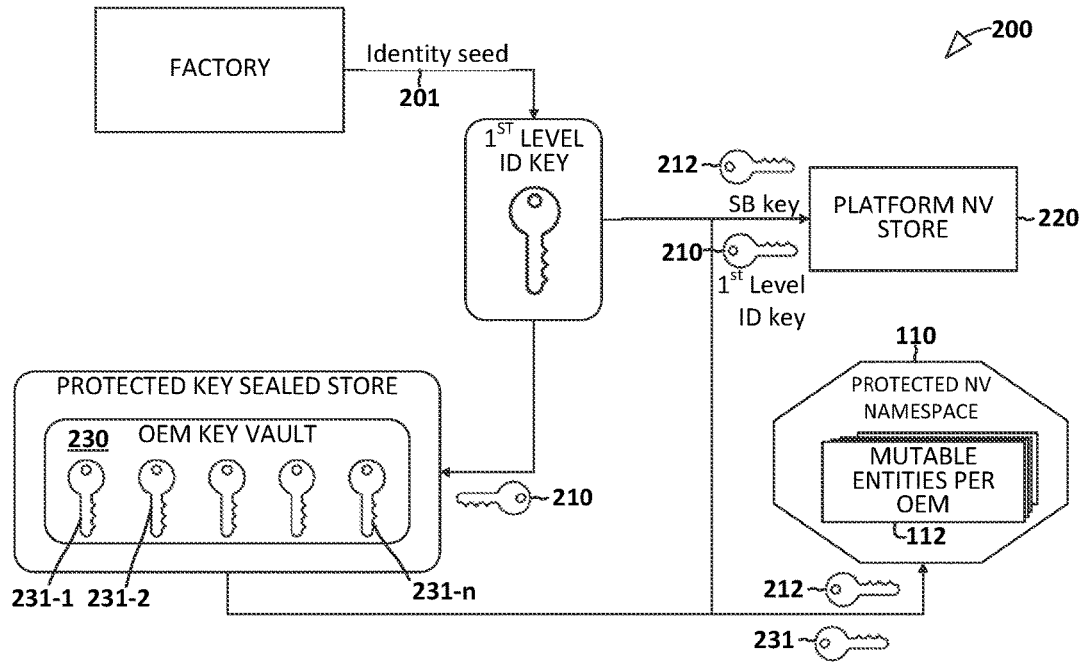
FIG. 2 illustrates exemplary two-level OEM security identity keys and sealing of factory keys.

Referring now to FIG. 2, aspects of a two level OEM security context identity method 200 are depicted. A factory-rooted identity seed 201 is used to create a first level identity key 210, which may be used in conjunction with a secure boot platform key or, more simply, secure boot (SB) key 212, for lock platform NVRAM 220 to secure the OEM context-specific boot signatures stored within. First level identity key 210 may also seal OEM key vault 230, which may be used to store one or more security identity keys 231-1, 231-2, . . . 231-*n*. In combination with SB key 212, secure identity key 231 secures protected OC namespace 110, which stores all OEM mutable entities 112.

Figure 3:
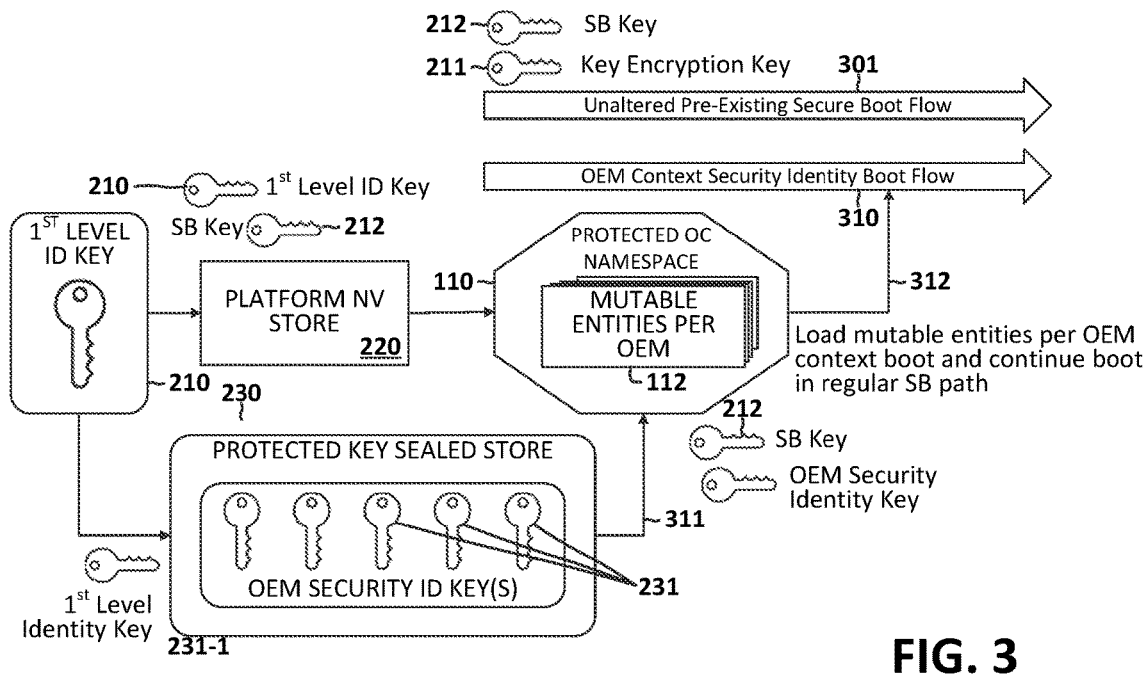
FIG. 3 illustrates exemplary dynamic rebranding based on an OEM boot context.

FIG. 3 illustrates an exemplary two-level OEM security identity key flow and factor key sealing method 300 used in conjunction with the resources illustrated in FIG. 2 and described above. On one level, the platform's pre-existing secure boot flow 301 uses the SB Key 212 and a key encryption key (KEK) to proceed unaltered. On another level, as first level identity key 210 is used to obtain one or more OEM security identity keys 231 from the key vault 230. First level identity key 210 is also used with SB key 212 to obtain OEM boot context signatures from platform NV store 220. The OEM security identity key 231 is applied (311) to the protected OC namespace 110 based on the current boot context and the mutable entities associated with the OEM context boot are loaded (312) to the OEM context security identity boot flow 310. In this manner, a single customer-agnostic firmware image is employed via secure boot flow 301 while also supporting mutable entity in which OEM security identity keys can differ.

Figure 4:
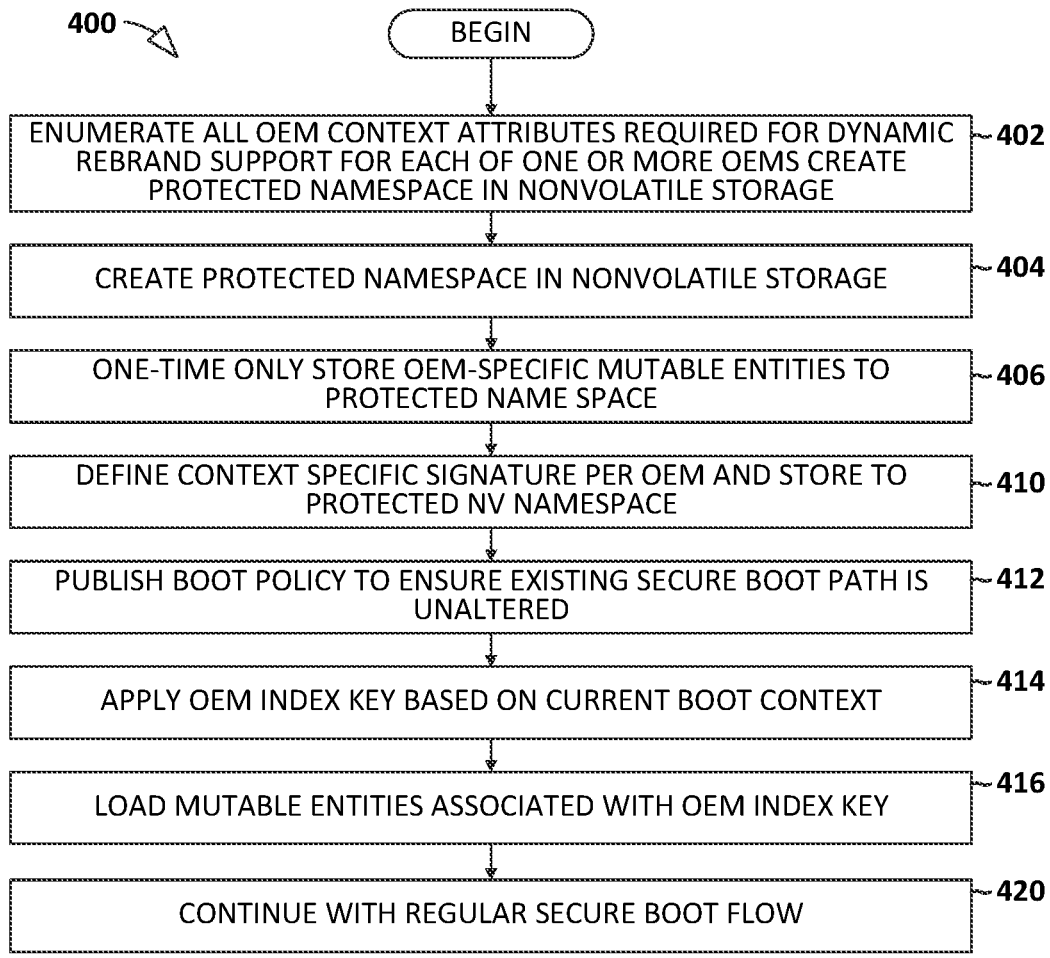
FIG. 4 illustrates a flow diagram of an OEM rebranding method.

Referring now to FIG. 4, a flow diagram illustrates a method 400 for enabling multiple secure context-specific boot paths for dynamic rebranding. The illustrated method 400 begins by enumerating (402) all OEM context attributes required for dynamic rebrand support for each of one or more OEMs. A protected namespace is created (404) in nonvolatile storage and a one-time only store (406) of OEM-specific mutable entities to protected name space is performed. Context-specific signatures may then be defined (410) for each of one or more OEMs and stored to a protected NV namespace. As depicted in FIG. 4, the boot policy is published (412) to ensure existing secure boot path is unaltered and the OEM index key applicable to the current boot context is applied (414). The appropriate mutable entities may be loaded (416) based on OEM context boot, at which point the regular secure boot path may continue (420).

Figure 5:
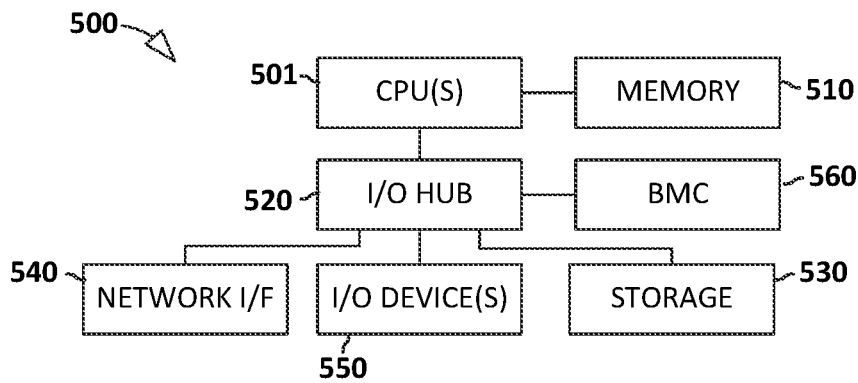
FIG. 5 illustrates an information handling system suitable for use in conjunction with subject matter disclosed with respect to FIGS. 1-4.

Referring now to FIG. 5, any one or more of the elements illustrated in FIG. 1 through FIG. 4 may be implemented as or within an information handling system exemplified by the information handling system 500 illustrated in FIG. 5. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 5 include a network interface 540, commonly referred to as a NIC (network interface card), storage resources 530, and additional I/O devices, components, or resources 550 including as non-limiting examples, keyboards, mice, displays, printers, speakers, microphones, etc. The illustrated information handling system 500 includes a baseboard management controller (BMC) 560 providing, among other features and services, an out-of-band management resource which may be coupled to a management server (not depicted). In at least some embodiments, BMC 560 may manage information handling system 500 even when information handling system 500 is powered off or powered to a standby state. BMC 560 may include a processor, memory, an out-of-band network interface separate from and physically isolated from an in-band network interface of information handling system 500, and/or other embedded information handling resources. In certain embodiments, BMC 560 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such-specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
   for each of one or more original equipment manufacturers (OEMs), enumerating all OEM context (OC) attributes associated with a dynamic rebrand protocol and storing OEM-specific mutable entities for each of the OEM context attributes in an OEM context (OC) namespace;
   storing one or more OC-specific signatures per OEM in a platform store;
   applying an OEM-specific index key determined based on a current boot context; and
   loading one or more of the OEM-specific mutable entities based on the current boot context before continuing in regular secure boot path.

2. The method of claim 1, wherein the storing of the one or more mutable entities comprises performing a one-time-only factory mode storing of the one or more mutable entities.

3. The method of claim 1, wherein the platform store comprises a platform nonvolatile (NV) store.

4. The method of claim 3, wherein the platform NV store comprises a serial peripheral interface (SPI) flash memory store.

5. The method of claim 4, wherein the OC namespace comprises a protected namespace.

6. The method of claim 1, further comprising:
   publishing an OEM context boot policy to ensure an existing secure boot path is unaltered.

7. The method of claim 1, further comprising:
   performing a customer agnostic secure boot flow to boot a customer agnostic firmware image.

8. An information handling system, comprising:
   a central processing unit (CPU);
   a computer readable memory, accessible to the CPU, including processor executable instructions that, when executed by the CPU, cause the system to perform operations comprising:
   for each of one or more original equipment manufacturers (OEMs), enumerating all OEM context (OC) attributes associated with a dynamic rebrand protocol and storing OEM-specific mutable entities for each of the OC attributes in an OEM context (OC) namespace;

storing one or more OC specific signatures per OEM in a platform store;
applying an OEM-specific index key determined based on a current boot context; and
loading one or more of the OEM-specific mutable entities based on the current boot context before continuing in regular secure boot path.

9. The information handling system of claim 8, wherein the storing of the one or more mutable entities comprises performing a one-time-only factory mode storing of the one or more mutable entities.

10. The information handling system of claim 8, wherein the platform store comprises a platform nonvolatile (NV) store.

11. The information handling system of claim 10, wherein the platform NV store comprises a serial peripheral interface (SPI) flash memory store.

12. The information handling system of claim 11, wherein the OC namespace comprises a protected namespace.

13. The information handling system of claim 8, wherein the operations further comprise:
publishing an OEM context boot policy to ensure an existing secure boot path is unaltered.

14. The information handling system of claim 8, wherein the operations further comprise:
performing a customer agnostic secure boot flow to boot a customer agnostic firmware image.

* * * * *